United States Patent Office

3,736,305
Patented May 29, 1973

3,736,305
PRODUCTION OF COPOLYMERS OF ETHYLENE
Klaus Kinkel, Rodenkirchen, Helmut Pfannmueller, Limburgerhof, Georg Schmidt-Thomee, Heidelberg, and Franz Georg Mietzner and Volker Gierth, Ludwigshafen, Germany, assignors to Badische Aniline- & Soda-Fabrik Aktiengesellschaft, Ludwigshafen (Rhine), Germany
No Drawing. Filed Dec. 19, 1968, Ser. No. 785,355
Int. Cl. C08f 15/40
U.S. Cl. 260—80.78
2 Claims

ABSTRACT OF THE DISCLOSURE

Production of copolymers of ethylene which contain polymerized units of (1) major amounts of ethylene; (2) minor amounts of $C_3$ to $C_{12}$ alkenecarboxylic acids; (3) minor amounts of $C_3$ to $C_8$ alkenes; and, if desired, (4¹) minor amounts of esters of $C_3$ to $C_{12}$ alkene carboxylic acids with $C_3$ to $C_8$ secondary or $C_4$ to $C_8$ tertiary alkanols and/or (4²) minor amounts of conventional other monomers which are copolymerizable with ethylene.

---

The present invention relates to a process for the production of copolymers of ethylene which contain polymerized units of:

(1) a major amount of ethylene;
(2) a minor amount of $C_3$ to $C_{12}$ alkene carboxylic acids;
(3) a minor amount of a $C_3$ to $C_8$ alkene; and, if desired,
(4¹) a minor amount of an ester of a $C_3$ to $C_{12}$ carboxylic acid with a $C_3$ to $C_8$ secondary alkanol or a $C_4$ to $C_8$ tertiary alkanol; and/or
(4²) a minor amount of a conventional other monomer which is copolymerizable with ethylene.

Copolymers of the said type may be prepared by polymerizing a mixture of ethylene, alkene carboxylic acid, alkene and, if desired, an ester and/or other monomer at relatively high pressure and relatively high temperature by means of free radical initiators. It is a disadvantage that alkene carboxylic acids under the said physical conditions are corrosive to a considerable extent, for example, on compressors, valves, piping and reactors, and this has the consequence that contaminated (discolored) copolymers are obtained. It is also a disadvantage that copolymers are obtained which are not uniform to the extent desired.

In order to obtain uncontaminated (not discolored) copolymers of the type in question, the procedure may be that first a mixture of ethylene, an ester of an alkenecarboxylic acid, an alkene and, if desired, additional other monomers are polymerized and then ester groups present in the resultant copolymers, are completely or partially converted into carboxylic acid groups, for example by pyrolytic or hydrolytic cleavage. First of all it is a disadvantage that two process stages are necessary. The pyrolytic cleavage of the ester groups is furthermore disadvantageous in that it requires the use of relatively high temperatures so that other undesired cleavage reactions also take place. This disadvantage does not occur in hydrolytic cleavage of the ester groups but this reaction in turn requires such long residence times and such a fine degree of dispersion that it has no industrial interest. Finally only copolymers which are not uniform to the desired extent are obtained according to the process described, independently of the type of the second process stage.

The present invention has for its object to provide a process of the type defined above which inter alia does not exibit the above-mentioned disadvantages or exhibits them to a great deal lesser degree.

We have found that this object can be achieved by a process in which a mixture of monomers which consists of:

(a) 100 molar parts of ethylene;
(b) 0.001 to 20 molar parts of an ester (E) of a $C_3$ to $C_{12}$ alkenecarboxylic acid with $C_3$ to $C_8$ sec-alkanol or $C_4$ to $C_8$ tert-alkanol which (E) decomposes by pyrolysis into $C_3$ to $C_{12}$ alkenecarboxylic acids and $C_3$ to $C_8$ or $C_4$ to $C_8$ alkenes at temperatures of from 110° to 350° C., and, if desired, additionally (c) up to 80 molar parts of conventional other monomers copolymerizable with ethylene is polymerized at pressures of from 100 to 8000 atmospheres and at temperatures of 110° to 350° C. but at least at a temperature at which the ester groups derived from the ester (E) wholly or partly decomposed by pyrolysis under the process conditions, by means of catalytic amounts of free radical initiators.

It is particularly surprising in this process that it can be carried out practically without corrosion phenomena, that it requires only relatively short residence times, that practically no thermal damage to the copolymers takes place in it and that the copolymers obtained are satisfactorily uniform.

The following may be said concerning the starting materials for the process according to this invention:

(a) The ethylene to be used should advantageously have a degree of purity of at least 98%;

(b) The esters defined above are used as esters (E); examples of suitable esters are tert-butyl acrylate, tert-butyl methacrylate, tert-butyl crotonate, isopropyl acrylate, isopropyl methacrylate, tert-butyl vinylacetate, ditert-butyl maleate, ditert-butyl fumarate, and tert-amyl acrylate. Esters of acrylic and methacrylic acid with tert-butyl methacrylate and tert-amyl acrylate and tert-amyl methacrylate, are particularly suitable.

(c) Examples of suitable conventional other monomers which are copolymerizable with ethylene are $C_3$ to $C_8$ alkenes; esters of $C_3$ to $C_{12}$ alkene carboxylic acids provided they do not fall within the definition given under (b); vinyl and alkenyl ethers; vinyl and alkenyl alcohols; N-vinyl and N-alkenyl compounds such as N-vinylpyrrolidone, N-vinylcarbazole and N-vinylcaprolactam; vinylidene fluoride; vinyl and alkenyl ketones; and vinyl acrylonitrile; alkenyl halides such as vinyl fluoride and vinylidene fluoride; vinyl and alkenyl betones; and vinyl and alkenyl sulfones and sulfonates. In addition to ethylenically unsaturated compounds, other copolymerizable substances, for example carbon monoxide and sulfur dioxide may be polymerized.

The process according to this invention may be carried out by conventional methods in conventional apparatus. Continuous operation of the process, particularly in tubular reactors such as are conventionally used for the high pressure polymerization of ethylene (cf. "Ullman's Enzykloipädie der technischen Chemie," 3rd edition, 14, 139 (1963)) has proved to be particularly suitable. Other reactors may however also be used, for example stirred autoclaves.

In continuous operation, the unreacted portion of the monomers is recycled in the usual manner. In the present case this portion includes part of the ethylene itself, part of the ester (E) itself and part of the $C_3$ to $C_8$ alkenes occurring in the course of the pyrolytic cleavage and of any other copolymerizable monomers of the type defined under (c). Since the latter like the $C_3$ to $C_8$ alkenes may act as polymerization regulators, it is generally advantageous to insure that these substances and the impurities present in the ethylene do not accumulate too strongly in the circulation but pass into the reactor in a constant concentration after the desired stationary conditions have been set up. This can be achieved, as usual, by bleeding an appropriate amount of the recycle mixture through an airlock. It should be noted that the molar concentration of $C_3$ to $C_8$ alkene units in the polymer should only be about half as much as in the monomer mixture in the polymerization.

The process according to the invention is carried out at pressures of 100 to 8000 atmospheres and at temperatures of 110° to 350° C. In continuous operation, particularly with tubular reactors, it has proved to be advantageous to use residence times of from twelve seconds to five minutes.

The polymerization itself is effected in conventional manner by means of catalytic amounts of free radical initiators. Suitable substances of this type are oxygen (advantageously in amounts of from 2 to 200 mole-p.p.m. with reference to the ethylene to be polymerized) and also peroxides and other free radical forming substances (including mixtures), for example tert-butylperoxy pivalate, ditertbutyl peroxide, tert-butyl hydroperoxide, tert-butyl perbenzoate, p-methane hydroperoxide, dilauroyl peroxide or azoisobutyronitrile, advantageously in amounts of from 1 to 200 molar p.p.m. with reference to the ethylene to be polymerized.

In a particular embodiment of the process according to this invention conventional polymerization regulators are present. Reference may be made for example to the suitability as regulators of hydrogen, ketones, alcohols and ethers (advantageously in amounts of frohm 0.1 to 5 mole percent with reference to the ethylene to be polymerized) and also normal and branched hydrocarbons (advantageously in amounts of from 0.005 to 5 mole percent with reference to the ethylene to be polymerized).

In another particular embodiment of the process according to this invention conventional pyrolysis catalysts are present. Reference may be made for example to the suitability of acids as pyrolysis catalysts; for example sulfonic acids, such as $\alpha$-naphthalene-sulfonic acid, or ansolvo acids such as boron trifluoride. The pyrolysis catalysts may advantageously be used in amounts of from 0.001 to 1.5 mole percent (with reference to the esters (E) used).

The following may be said concerning the abovementioned pyrolysis catalyst: according to the invention (a) ethylene, (b) a special ester (E) and optionally (c) other additional monomers are introduced into the polymerization zone. Since the ester (E) can decompose under the polymerization conditions, particularly at the polymerization temperature, by pyrolysis into the corresponding alkenecarboxylic acid and the corresponding alkene, these substances are probably present as well as the substances (a) and (b) and (c), if any. This is supported by the fact that with increasing operating temperature and/or increasing amount of pyrolysis there is present in the copolymer relatively less ester groups (from polymerized units of ester (E)) and relatively more carboxylic acid groups (probably from polymerized units of alkene carboxylic acid). Whatever may be the real reason for this, it provides the following teaching: if a copolymer is desired which has relatively few, down to practically no, ester groups and relatively many carboxylic acid groups, it is necessary to use relatively high temperatures and/or relatively large amounts of pyrolysis catalyst; if on the other hand a copolymer is desired which has relatively many ester groups and relatively few carboxylic acid groups, relatively low temperatures and/or relatively small amounts of pyrolysis catalyst or none at all should be used.

Copolymers prepared by the process according to this invention are particualrly suitable as hot-melt adhesives for metals, ceramics, paper, textiles, plastics, wood, glass and the like (particularly when they have a relatively large proporation of polymerized units of alkene carboxylic acids) or as starting materials for the production of film or sheeting (particularly in the case of a relatively small proportion of polymerized units of alkene carboxylic acids). The copolymers may moreover be used for example for the production of very durable fibers and fabrics; fibers, fabrics, film sheeting and other materials prepared from the copolymers may be dyed and printed easily by most of the usual methods, unlike those prepared from homopolyethylene. By blending with homopolyolefins, mixtures which are capable of being printed and dyed are also obtained. Another field of application is the production of elastic, very strong fine pored foams. Copolymers having a relatively high content of carboxylic groups give articles having high transparency comparable with glass by pressmolding and by injection molding. They are therefore suitable for the thermoplastic bonding of sheets of glass to form panes of safety glass. Emulsions and solutions with which the bond strength of thermoplastics to solid surfaces (for example of polyethylene to metals, paper, ceramics, wood or plastics) can be improved by spraying may also be prepared from the copolymers.

Two different tubular reactors such as are customary in the continuous high pressure polymerization of ethylene serve as polymerization apparatus for operation according to the following examples, unless otherwise stated.

Reactor (A)

The diameter of the reaction tube to its length is in the ratio 1:40,000. The reaction tube is surrounded by a jacket tube for the reception of a heat transfer medium. The jacket tube is divided into two zones operable independently of one another, of which the first extends over two-fifths of the length of the tube (Zone I) and the second over the remaining three-fifths of the tube (Zone II). At the end of the reaction tube a valve is provided which serves (i) to regulate the pressure in the polymerization zone and (ii) to discharge the reaction material. Attached to this valve are a conventional high pressure separator and a conventional low pressure separator to separate the copolymer obtained from the unpolymerized substance, i.e. substantially from the portions of monomers not involved in the reaction including olefins formed by pyrolysis during the polymerization; they are returned by recycling into the actual reactor and such an amount of these portions is removed through an airlock that stationary conditions are set up when the reactor is operated continuously.

Reactor (B)

The ratio of the diameter of the reaction tube to its length is 1:20,000. The reactor has no high pressure separator, but only a conventional low pressure separator. In other respects reactor (B) is the same as reactor (A) and is operated in an analogous manner.

The data given in the examples are determined by means of the following methods:

melt-index according to 150 TC 61-recommendation;
density according to DIN 53,479/7.2;
tensile strength, tear resistance and elongation according to DIN 5,331;
melting point under the heated stage microscope.

The content of ester groups in the copolymers is determined by infrared spectroscopy; the content of carboxylic acid groups is calculated from the determination of oxygen by chemical analysis bearing in mind the ester group determination with the infrared spectroscope. The content of alkene in the polymer is detected in the infrared spectrum but can only be estimated because of its relatively low value (estimated value about 1 mole percent); it is determined in some examples from the balance of amounts before and after polymerization by means of accurate gas analysis (for the calculation see Example 30).

The parts and percentages given in the examples are by weight unless otherwise stated.

EXAMPLE 1

Reactor (A) is charged on the inlet side with a mixture (compressed to 2200 atmospheres) consisting of (a) 1000 parts per hour of ethylene, (b) 14.3 parts per hour of tert-butyl acrylate and (c) 1.1 mole percent of isobutylene with reference to ethylene (part of the ethylene and the isobutylene originating from the recycle gas) and also 25 mole-p.p.m. of oxygen with reference to ethylene. The heat transfer medium in zone I of the reactor jacket is kept at a constant temperature of 180° C. and in zone II at 250° C. The reaction material reaches a maximum temperature of about 280° C. as a result of the heat of reaction liberated. The residence time of the material in the reactor is about one minute.

In this way 156 parts per hour of a copolymer is obtained which is not discolored and has satisfactory uniformity. Its physical data are:

Polymerized units of acrylic acid—5.1% by weight.
Polymerized units of ester—not detectable.
Melt index—9.7.
Density—0.9283 g./ccm.
Tensile strength—81 kg./cm.$^2$.
Tear resistance—156 kg./cm.$^2$.
Elongation at break—490%.
Melting point—100° to 104° C.

EXAMPLE 2

The procedure of Example 1 is followed but the mixture at the inlet side of the reactor contains 26 (not 14.3) parts per hour of tert-butyl acrylate and 1.25 (not 1.1) mole percent of isobutylene (maximum polymerization temperature: 2780 C.).

162 parts per hour of a copolymer is obtained which is not discolored and has satisfactory uniformity. Its physical data are:

Polymerized units of acrylic acid—8.9% by weight.
Polymerized units of ester—not detectable.
Melt index—11.7
Density—0.9338 g./ccm.
Tensile strength—74kg./cm.$^2$.
Tear resistance—187 kg./cm.$^2$.
Elongation at break—470%.
Melting point—97° to 101° C.

EXAMPLE 3

Reactor (B) is fed on the inlet side with a mixture, compressed to 3000 atmospheres, consisting of (a) 380 parts per hour of ethylene,
(b) 6.2 parts per hour of tert-butyl acrylate, and
(c) 0.75 mole percent of isobutylene with reference to ethylene (part of the ethylene and the isobutylene and the isobutylene originating from the recycle gas stream) and 21 mole-p.p.m. of oxygen with reference to ethylene. The heat transfer medium is kept at a constant temperature of 170° C. in zone I of the reactor jacket and at 240° C. in zone II. The reaction material achieves a maximum temperature of 268° C. as a result of the heat of reaction liberated. The residence time of the reaction material is about one minute.

78 parts per hour of copolymer is obtained in this way; it is not discolored and has satisfactory uniformity. Its physical data are:

Polymerized units of acrylic acid—4.4% by weight.
Polymerized units of ester—not detectable.
Melt index—6.6.
Density—0.9271 g./ccm.
Tensile strength—87 kg./cm.$^2$.
Tear resistance—163 kg./cm.$^2$.
Elongation at break—520%.
Melting point—102° to 104° C.

EXAMPLE 4

The procedure of Example 3 is adopted under the following conditions:

Pressure on the inlet side—3000 atmospheres.
Ethylene—380 parts per hour.
Tert-butyl acrylate—23.1 parts per hour.
Isobutylene—1.2 mole percent.
Oxygen—20 mole-p.p.m.
Heat transfer medium, zone I—170° C.
Heat transfer medium, zone II—280° C.
Maximum temperature of reaction material—295° C.

In this way 61 parts per hour of a copolymer is obtained having the following physical data:

Polymerized units of acrylic acid—20.9% by weight.
Polymerized units of ester—not detectable.
Melt index—25.6.
Density—0.9568 g./ccm.
Tensile strength—55 kg./cm.$^2$.
Tear resistance—238 kg./cm.$^2$.
Elongation at break—380%.
Melting point—89° to 93° C.

EXAMPLE 5

A procedure of Example 3 is followed under the following conditions:

Pressure on the inlet side—3000 atmospheres.
Ethylene—380 parts per hour.
Tert-butyl acrylate—22.7 parts per hour.
Isobutylene—0.95 mole percent.
Oxygen—21 mole-p.p.m.
Heat transfer medium, zone I—170° C.
Maximum temperature of reaction material—293° C.

In this way 69 parts per hour of a copolymer is obtained having the following physical data:

Polymerized units of acrylic acid—18.1% by weight.
Polymerized units of ester—not detectable.
Melt index—4.9.
Density—0.9532 g./ccm.
Tensile strength—65 kg./cm.$^2$.
Tear resistance—241 kg./cm.$^2$.
Elongation at break—370%.
Melting point—92° to 95° C.

EXAMPLE 6

The procedure of Example 3 is followed under the following conditions:

Pressure on the inlet side—3000 atmospheres.
Ethylene—380 parts per hour.
Tert-butyl acrylate—21.7 parts per hour.
Isobutylene—0.95 mole percent.
Oxygen—21 mole-p.p.m.
Heat transfer medium, zone I—175° C.
Heat transfer medium, zone II—240° C.
Maximum temperature of reaction material—285° C.

In this way 68 parts per hour of a copolymer is obtained which has the following physical data:

Polymerized units of acrylic acid—17.5% by weight.
Polymerized units of ester—not detectable.
Melt index—13.9.
Density—0.9531 g./ccm.
Tensile strength—65 kg./cm.$^2$.
Tear resistance—247 kg./cm.$^2$.
Elongation at break—380%.
Melting point—86° to 90° C.

EXAMPLE 7

The procedure of Example 3 is followed under the following conditions:

Pressure on the inlet side—3300 atmospheres.
Ethylene—280 parts per hour.
Tert-butyl acrylate—13.7 parts per hour.
Isobutylene—1.1 mole percent.
Oxygen—25 mole-p.p.m.
Transfer medium, zone I—175° C.
Transfer medium, zone II—240° C.
Maximum temperature of reaction material—270° C.

In this way 65 parts per hour of a copolymer is obtained having the following physical data:

Polymerized units of acrylic acid—11.6% by weight.
Polymerized units of ester—not detectable.
Melt index—4.32.
Density—0.9379 g./ccm.
Tensile strength—43 kg./cm.$^2$.
Tear resistance—165 kg./cm.$^2$.
Elongation at break—400%.
Melting point—80° to 105° C.

EXAMPLE 8

The procedure of Example 1 is followed under the following conditions:

Pressure on the inlet side—2300 atmospheres.
Ethylene—1000 parts per hour.
Tert-butyl acrylate—29.2 parts per hour.
Isobutylene—0.75 mole percent.
Oxygen—29 mole-p.p.m.
Heat transfer medium, zone I—180° C.
Heat transfer medium, zone II—260° C.
Maximum temperature of reaction material—281° C.

In this way, 165 parts of a copolymer is obtained having the following physical data:

Polymerized units of acrylic acid—9.7% by weight.
Polymerized units of ester—not detectable.
Melt index—110.
Density—0.9321 g./ccm.
Tensile strength—51 kg./cm.$^2$.
Tear resistance—142 kg./cm.$^2$.
Elongation at break—420%.
Melting point—93° to 96° C.

EXAMPLE 9

The procedure of Example 1 is followed under the following conditions:

Pressure on the inlet side—2300 atmospheres.
Ethylene—1000 parts per hour.
Tert-amyl acrylate—21.4 parts per hour.
Amylene—0.95 mole percent.
Oxygen—26 mole-p.p.m.
Heat transfer medium, zone I—180° C.
Heat transfer medium, zone II—270° C.
Maximum temperature of reaction material—280° C.

In this way, 161 parts of a copolymer is obtained having the following physical data:

Polymerized units of acrylic acid—6.5% by weight.
Polymerized units of ester—not detectable.
Melt index—10.6.
Density—0.9295 g./ccm.
Tensile strength—74 kg./cm.$^2$.
Tear resistance—173 kg./cm.$^2$.
Elongation at break—500%.
Melting point—97° to 100° C.

EXAMPLE 10

13.4 ccm. of tert-butyl acrylate, 200 ccm. of diethyl ether devoid of peroxide and 0.5 g. of α-naphthalene sulfonic acid (pyrolysis catalyst) dissolved in 25 ccm. of methanol are introduced under nitrogen devoid of oxygen into the reaction zone having a capacity of 5 liters of a stainless steel autoclave provided with a magnetic stirrer. Ethylene is then pressured in at a pressure of 1100 atmospheres and contains 50 mole-p.p.m. of oxygen (initiator). The autoclave is then heated, with the stirrer switched on, to 183° C. within two hours by means of a heated cycle. The pressure rises to a maximum of 1950 atmospheres. After the temperature of the contents of the autoclave has reached 183° C., it rises to a maximum of 207° C. by reason of the polymerization heat liberated. The autoclave is then decompressed and cooled in about ten to fifteen minutes to below 100° C.; after it has fully cooled the autoclave is opened and 114 g. of white copolymer is obtained which has the following properties:

Polymerized units of acrylic acid—2.25% by weight.
Polymerized units of ester—not detectable.
Melt index—0.23.
Density—0.9307 g./ccm.
Tensile strength—109 kg./cm.$^2$.
Tear resistance 135 kg./cm.$^2$.
Elongation at break—350%.
Melting point—107° to 112° C.

EXAMPLES 11 TO 16

Polymerization is carried out in the manner described in Example 10 but with different esters of unsaturated acids.

Charge in the autoclave:

200 ccm. of diethyl ether devoid of peroxide
0.5 g. of α-naphthalene sulfonic acid dissolved in 25 ccm. of methanol
initiators and comonomers (see Table 1)

The following abbreviations are used in Table 1:

E=Example number.
Ester=number of ccs. of ester of unsaturated acid
I=initiator
PP=polymerization pressure in atmospheres
PT=polymerization temperature in ° C.
PY=yield of polymer in grams
IPA=isopropyl acrylate
TBM=tert-butyl methacrylate
TBVA=tert-butyl vinylacetate
IPM=isopropyl methacrylate
DIPF=diisopropyl fumarate
A=50 mole-p.p.m. of $O_2$
B=0.65 g. of di-tert-butyl peroxide

TABLE 1

| E | Ester | | I | PP | PT | PY |
|---|---|---|---|---|---|---|
| 11 | 51 | IPA | A | 1,850 | 180–189 | 34 |
| 12 | 15 | TBM | A | 1,700 | 184–200 | 47 |
| 13 | 75 | TBM | B | 1,800 | 188–201 | 18 |
| 14 | 40 | TBVA | A | 1,600 | 177–192 | 46 |
| 15 | 25 | IPM | A | 2,050 | 192–204 | 21 |
| 16 | 18.3 | DIPf | A | 1,800 | 183–197 | 44 |

The properties of the copolymers obtained are collected in Table 2: the following abbreviations are used:

Acid=percentage by weight of polymerized units of carboxylic acid
MI=melt index
Density=density in g./ccm.
TS=tensile strength in kg./cm.$^2$
TR=tear resistance in kg./cm.$^2$
EB=elongation in percent at break
MP=melting point in ° C.
AA=acrylic acid
MAA=methacrylic acid
VAA=vinylacetic acid
FA=fumaric acid

TABLE 2

| E | Acid | | MI | Density | TS | TR | EB | MP |
|---|---|---|---|---|---|---|---|---|
| 11 | 11.3 | AA | 3.4 | 0.9397 | 61 | 120 | 280 | 98–101 |
| 12 | 4.3 | MAA | 0.76 | 0.9358 | 106 | 159 | 390 | 108–112 |
| 13 | 28.5 | MAA | 0.41 | 0.9837 | 135 | 144 | 200 | 75–80 |
| 14 | 1.6 | VAA | 6.2 | 0.9370 | 172 | 131 | 360 | 117–120 |
| 15 | 6.5 | MAA | 0.50 | 0.9360 | 96 | 223 | 680 | 103–106 |
| 16 | 3.7 | FA | 1.9 | 0.9371 | 80 | 236 | 610 | 105–109 |

EXAMPLE 17

A procedure analogous to that in Example 1 is followed but ditert-butyl peroxide serves as the initiator and in addition α-naphthalenesulfonic acid is used as the pyrolysis catalyst and acetone as the polymerization regulator. The other conditions are as follows:

Pressure on the inlet side—2200 atmospheres.
Ethylene—1000 parts per hour.
Tert-butyl acrylate—21.2 parts per hour.
Isobutylene—1.8 mole percent.
Initiator—0.058 part per hour of DTBP.
Heat transfer medium, zone I—195° C.
Heat transfer medium, zone II—210° C.
Maximum temperature of reaction material—234° C.
Acetone—1.7 parts per hour.
α-Naphthalenesulfonic acid—0.20 parts per hour.

In this way, 136 parts per hour of a copolymer is obtained which has the following physical data:

Units of polymerized acrylic acid—8.5% by weight.
Units of polymerized ester—not detectable.
Melt index—84.
Density—0.9310 g./ccm.
Tensile strength—73 kg./cm.$^2$.
Tear resistance—164 kg./cm.$^2$.
Elongation at break—330%.
Melting point—96 to 100° C.

EXAMPLE 18

Reactor (A) is charged on the inlet side with a mixture compressed to 2,200 atmospheres and consisting of (a) 1000 parts per hour of ethylene, (b) 48.6 parts per hour of tert-butyl acrylate and (c) 0.8 mole percent of isobutylene with reference to ethylene (some of the ethylene, some of the ester and the isobutylene originating from the circulation) and 18 mole-p.p.m. of oxygen with reference to ethylene. The heat transfer medium in zone I of the reactor jacket is kept at a constant temperature of 155° C. and in zone II at 200° C.; the reaction material reaches a maximum temperature of about 238° C. as result of the heat of reaction liberated. The residence time of the reaction material in the reactor is about one minute. Acrylic acid and carbon dioxide cannot be detected in the unreacted ethylene by infrared analysis.

173 parts per hour of a copolymer is obtained which is not disclored and has satisfactory uniformity. Its physical data are:

Units of polymerized acrylic acid—10.4% by wt.
Units of polymerized ester—9.6% by wt.
Melt index—15.3.
Density—0.9441 g./ccm.
Tensile strength—38 kg./cm.$^2$.
Tear resistance—232 kg./cm.$^2$.
Elongation at break—460%.
Melting point—88° to 90° C.

The copolymer is suitable, by reason of its excellent adherence, as a hot-melt adhesive for metals, glass, wood, leather, stone, various plastics, porcelain and the like. A thin interlayer thereof is sufficient to make a firm and enduring bond. The places to be bonded have to be sealed by heating for a short time above the melting point of the copolymer.

EXAMPLES 19 to 27

Polymerization is carried out in the manner described in Example 18 with the modifications indicated in Table 3. The following abbreviations are used in Table 3:
E=Examples number
TI (TII)=temperature in ° C. in zone I (II) of the reactor jacket
In=initiator-mole-p.p.m. of O$_2$
IB=mole percent of isobutylene
TBA=parts per hour of tert-butyl acrylate
MTP=maximum temperature in the polymerization in ° C.
CP=parts per hour of copolymer obtained

TABLE 3

| E | TI | TII | In | IB | TBA | MTP | CP |
|---|---|---|---|---|---|---|---|
| 19 | 135 | 190 | 18 | 0.3 | 31.5 | 197 | 172 |
| 20 | 140 | 200 | 18 | 0.6 | 26.1 | 212 | 186 |
| 21 | 140 | 187 | 18 | 0.3 | 13.2 | 218 | 169 |
| 22 | 145 | 190 | 18 | 0.3 | 7.6 | 229 | 170 |
| 23 | 145 | 200 | 18 | 0.55 | 29.2 | 226 | 187 |
| 24 | 160 | 200 | 18 | 0.45 | 28.4 | 233 | 170 |
| 25 | 155 | 200 | 18 | 0.6 | 40.2 | 237 | 178 |
| 26 | 155 | 200 | 18 | 1.95 | 30.7 | 239 | 166 |
| 27 | 160 | 220 | 25 | 0.7 | 26.9 | 244 | 168 |

The properties of the copolymer obtained are collected in Table 4 in which the following abbreviations are used:
E=Example number
TBA=percent by weight of tert-butyl acrylate in the copolymer
AA=percent by weight of acrylic acid in the copolymer
MI=melt index
Density=density in g./ccm.
TS=tensile strength in kg./cm.$^2$
TR=tear resistance in kg./cm.$^2$
EB=elongation in percent at break
MP=melting point in ° C.

TABLE 4

| E | TBA | AA | MI | Density | TS | TR | EB | MP |
|---|---|---|---|---|---|---|---|---|
| 19 | 13.52 | 1.40 | 3.04 | 0.9238 | 49 | 224 | 620 | 107–110 |
| 20 | 10.56 | 1.43 | 21.5 | 0.9247 | 43 | 160 | 530 | 94–98 |
| 21 | 5.48 | 0.98 | 0.73 | 0.9224 | 84 | 216 | 580 | 107–110 |
| 22 | 2.74 | 0.92 | 0.61 | 0.9224 | 84 | 165 | 560 | 106–109 |
| 23 | 9.15 | 2.73 | 8.27 | 0.9246 | 53 | 182 | 550 | 96–100 |
| 24 | 8.62 | 3.93 | 14.08 | 0.9268 | 46 | 183 | 510 | 95–98 |
| 25 | 8.78 | 8.13 | 11.5 | 0.9377 | 42 | 216 | 460 | 88–91 |
| 26 | 5.39 | 6.85 | 120.0 | 0.9275 | 47 | 140 | 460 | 91–94 |
| 27 | 2.40 | 7.51 | 10.2 | 0.9314 | 66 | 140 | 350 | 97–100 |

EXAMPLE 28

The procedure of Example 18 is followed but using acetone as a polymerization regulator. Details of conditions are:

Pressure on the inlet side—2200 atmospheres.
Ethylene—1000 parts/hour.
Tert-butyl acrylate—12.6 parts/hour.
Isobutylene—0.75 mole percent.
Initiator—18 mole-p.p.m. O$_2$.
Heat transfer medium, Zone I—155° C.
Heat transfer medium, Zone II—230° C.
Maximum temperature of reaction material—244° C.
Acetone-2.2 mole percent with reference to ethylene.

In this way, 130 parts per hour of a copolymer is obtained having the following physical data:

Units of polymerized acrylic acid—3.99% by wt.
Units of polymerized tert-butyl acrylate—2.51% by wt.
Melt index—101.0.
Density—0.9321 g./ccm.
Tensile strength—65 kg./cm.$^2$.
Tear resistance—86 kg./cm.$^2$.
Elongation at break—340%.
Melting point—102°–104° C.

EXAMPLE 29

The procedure of Example 18 is followed under the following conditions:

Pressure at the inlet side—2200 atmospheres.
Ethylene—1000 parts/hour.
Tert-butyl acrylate—22.2 parts/hour.
Isobutylene—1.1 mole percent.
Initiator—0.050 part/hour of ditert-butyl peroxide.
Heat transfer medium, zone I—160° C.
Heat transfer medium, zone II—190° C.
Maximal temperautre of reaction material—241° C.

In this way, 178 parts per hour of a copolymer is obtained have the following physical data:

Units of polymerized acrylic acid—5.6% by wt.
Units of polymerized tert-butyl acrylate—2.54% by wt.
Melt index—10.6.
Density—0.9295 g./ccm.
Tensile strength—74 kg./cm.$^2$.
Tear resistane—173 kg./cm.$^2$.
Elongation at break—500%.
Melting point—97–100° C.

EXAMPLES 30 TO 32

A procedure is followed which is analogous to that in Example 3 with the modifications indicated in Table 5, polymerizaiton being carried out in each case for thirty hours under constant conditions and continuous analytical control. To determine the polymerized units of isobutylene, particularly careful and accurate determination of the isobutylene content of the gas coming from the reactor and the acrylic acid content of the copolymers is necessary.

The following abbreviations are used in Table 5:

Ex=Example number
TI (TII)=temperautre in ° C. in zone I (zone II)
In=Initiator (mole-p.p.m. of $O_2$)
E+I=Ethylene (+isobutylene) in parts per hour
ICP=isobutylene content in mole percent prior to reaction
TBA=tert-butyl acrylate in parts per hour to reactor
MPT=maximum polymerization temperautre in ° C.
CP=copolymer in parts per hour
ICA=isobutylene content in mole percent after the reactor

TABLE 5

| Ex | TI | TII | In | E+I | ICP | TBA | MPT | PT | ICA |
|---|---|---|---|---|---|---|---|---|---|
| 30 | 155 | 220 | 16 | 364 | 0.95 | 14.6 | 236 | 66 | 1.66 |
| 31 | 160 | 220 | 21 | 377 | 1.01 | 21.2 | 254 | 65 | 2.39 |
| 32 | 160 | 220 | 17 | 363 | 0.91 | 15.7 | 248 | 41 | 1.87 |

The properties of the copolymers obtained are given in Table 6 in which the following abbreviations are used:
The following abbreviations are used in Table 6:

Ex=Example number
TBA=polymerized units of tert-butyl acrylate in the copolymer in percent by weight; consistent results from infrared spectroscopic analysis and ester pyrolysis (vacuum, 300° to 350° C., quantitative isobutylene determination of the pyrolysis product collected in a strongly cooled trap)
AA=polymerized units of acrylic acid in the copolymer in percent by weight
IB=polymerized units of isobutylene in percent by weight in the copolymer
MI=melt index
Density=density in g./ccm.
TS=tensile strength in kg./cm.$^2$
TR=tear resistance in kg./cm.$^2$
EB=elongation at break in percent
MP=melting point in ° C.

TABLE 6

| Ex | TBA | AA | IB | MI | Density | TS | TR | EB | MP |
|---|---|---|---|---|---|---|---|---|---|
| 30 | 7.69 | 8.33 | 1.45 | 9.33 | 0.9346 | 36 | 188 | 480 | 85–105 |
| 31 | 1.53 | 18.51 | 1.91 | 6.9 | 0.9540 | 55 | 238 | 390 | 88–92 |
| 32 | 4.88 | 20.89 | 1.98 | 27.0 | 0.9638 | 54 | 258 | 360 | 101–103 |

The isobutylene contents of the polymers result from the difference in the amounts of isobutylene supplied to the reactor plus isobutylene freshly formed by ester pyrolysis minus isobutylene withdrawn from the reactor. The calculation is given below for Example 30 only. The isobutylene content of the polymers of Examples 31 and 32 is determined in the same way. In the calculation, $C_4H_8$=isobutylene; TB=tert-butyl acrylate and AA=acrylic acid.

364 parts per hour of a mixture of ethylene and 0.95 mole percent of isobutylene is passed into the reactor. This composition is equivalent to:

6.83 parts per hour of $C_4H_8$ and
357.17 parts per hour of $C_2H_4$.

The polymer formed has the following composition:

5.07 parts per hour of TBA (7.69% by weight)
5.50 parts per hour of AA (8.33% by weight)
55.43 parts per hour of $C_2H_4+C_4H_8$ 66.00 parts per hour of polymer.

Instead of the polymerized acrylic acid units there is an equimolar amount of isobutylene formed by pyrolytic ester cleavage:

$\frac{5.5 \times 56}{72}$ = 4.28 parts per hour of $C_4H_8$ (freshly formed in the polymerization)

If no units of isobutylene were introduced, the gas leaving the reactor would have the following composition:

|  | Parts/hour |
|---|---|
| $C_2H_4$ to the reactor | 357.17 |
| $C_2H_4$ units introduced in polymerized form | 55.43 |
| $C_2H_4$ at the reactor outlet | 301.74 |

|  | Parts/hour |
|---|---|
| $C_4H_8$ to the reactor | 6.83 |
| $C_4H_8$ freshly formed by pyrolysis | 4.28 |
| $C_4H_8$ at the reactor outlet | 11.11 |

From this, assuming that there is no introduction of polymerized units of isobutylene, an isobutylene content of the recycle ethylene can be calculated as:

$$\frac{\frac{11.11}{56} \times 100}{\frac{301.74}{28} + \frac{11.11}{56}} = 1.81 \text{ mole percent of } C_4H_8$$

In fact the content of $C_4H_8$ found in the recycle ethylene is not 1.81 mole percent only 1.66 mole percent because of the isobutylene does take part in the polymerization. This 1.66 mole percent of $C_4H_8$ corresponds to 10.15 parts per hour of $C_4H_8$ when 301.74 parts of $C_2H_4$ per hour (see above) is taken for the amount of recycle ethylene; this can be done without any significant error because of the very small amount of polymerized isobutylene units in relation to the recycle ethylene.

The calculation gives an isobutylene content of 1.45 mole percent in the polymer:

$C_4H_8$ in recycle ethylene when there is no participation in the polymerization ........ 11.11 parts/hour.
$C_4H_8$ found in the recycle ethylene (1.66 mole percent) .................. 10.15 parts/hour.

$C_4H_8$ participating in the polymerization of 66 parts of polymer per hour. 0.96 part/hour or 1.45% by weight of $C_4H_8$.

EXAMPLE 33

The method of Example 18 is followed under the following conditions:

Pressure on the inlet side—2200 atmospheres
Ethylene—1000 parts/hour
Tert-amyl acrylate—20.1 parts/hour
Amylene—0.8 mole percent
Oxygen—20 mole-p.p.m.
Heat transfer medium, zone I—160° C.
Heat transfer medium, zone II—190° C.
Maximum temperature of reaction material—240. C.

In this way 153 parts per hour of copolymer having the following physical data is obtained:

Polymerized units of amyl acrylate—2.42% by wt.
Polymerized units of acrylic acid—4.91% by wt.
Melt index—9.4.
Density—0.9301 g./ccm.
Tensile strength—72 kg./cm.$^2$.
Tear resistance—187 kg./cm.$^2$.
Elongation at break—520%.
Melting point—98° to 101° C.

EXAMPLE 34

13.4 ccm. of tert-butyl acrylate, 200 ccm. of diethyl ether devoid of peroxide, 0.65 g. of ditert-butyl peroxide and 0.1 g. of α-naphthalenesulfonic acid (pyrolysis catalyst) dissolved in 25 ccm. of methanol are placed in the 5 liter reaction chamber of a stainless steel autoclave fitted with a magnetic stirrer. Ethylene is then pressured in at a pressure of 1020 atmospheres and the autoclave is heated with eighty minutes to 138° C. with the stirrer switched on. The pressure rises to a maximum of 1750 atmospheres. After the temperature of the autoclave contents has reached 138° C., it rises within one to two minutes to a maximum of 150° C. in consequence of the heat of polymerization liberated. The pressure on the autoclave is then released and the autoclave cooled in about ten minutes to below 100° C.; after cooling is complete, the autoclave is opened and 38 g. of white substantially uniform copolymer is obtained which has the following physical data:

Polymerized units of acrylic acid—4.1% by wt.
Polymerized units of tert-butyl acrylate—1.8% by wt.
Melt index—2.6.
Density—0.930 g./ccm.
Tensile strength—89 kg./cm.$^2$.
Tear resistance—251 kg./cm.$^2$.
Elongation at break—620%.
Melting point—113° to 116° C.

EXAMPLES 35 TO 40

A procedure similar to that in Example 34 is followed but with different esters of unsaturated carboxylic acids.
The process conditions are as follows:

Autoclave charge—
　200 ccm. of dimethyl ether devoid of peroxide,
　0.1 g. of α-naphthalenesulfonic acid,
　25 ccm. of methanol,
　initiator and comonomers: see Table 7.

The following abbreviations are used in Example 7:

Ex=Example number
Ester=amount in ccm. of ester of an unsaturated carboxylic acid
Initiator=amount in mole-p.p.m. (p) or grams (g.) of initiator
DTBP=ditert-butyl peroxide
PP=polymerization pressure in atmospheres
PT=polymerization temperature in ° C.
Polymer=amount of polymer in grams
IPA=isopropyl acrylate
TBMA=tert-butyl methacrylate
IPMA=isopropyl methacrylate
TBVA=tert-butyl vinylacetate
DIPF=diisopropyl fumarate.

TABLE 7

| Ex | Ester | | Initiator, p.p.m. O[1] | PP | PT | Polymer |
|---|---|---|---|---|---|---|
| 35 | 51 | IPA | 50 | 1,700 | 132–146 | 61 |
| 36 | 15 | TBMA | 1 0.65 | 1,800 | 136–152 | 37 |
| 37 | 75 | TBMA | 50 | 1,700 | 137–150 | 52 |
| 38 | 13.3 | IPMA | 50 | 1,950 | 127–147 | 34 |
| 39 | 82 | TBVA | 50 | 1,600 | 137–152 | 46 |
| 40 | 54 | DIPF | 50 | 1,760 | 131–147 | 63 |

[1] Grams DTBP.

The properties of the copolymer obtained are collected in Table 8 in which the following abbreviations (other than those used in Table 7) are used.

PU Ester=polymerized units of ester in percent by weight
PU Acid=polymerized units of acid in percent by weight
MI=melt index
Density=density in g./ccm.
TS=tensile strength in kg./cm.$^2$
TR=tear resistance in kg./cm.$^2$
EB=elongation in percent at break
M.P.=melting point in ° C.
AA=acrylic acid
MA=methacrylic acid
VA=vinylacetic acid
FA=fumaric acid

TABLE 8

| Ex | PU ester | | PU acid | | MI | Density | TS | TR | EB | MP |
|---|---|---|---|---|---|---|---|---|---|---|
| 35 | 13.4 | IPA | 3.1 | AA | 4.0 | 0.9320 | 32 | 303 | 700 | 95–100 |
| 36 | 1.9 | TBMA | 3.3 | MA | 2.8 | 0.9291 | 91 | 245 | 570 | 100–112 |
| 37 | 26.2 | TBMA | 12.7 | MA | 11.5 | 0.9466 | 17 | 307 | 770 | 92–95 |
| 38 | 2.6 | IPMA | 2.7 | MA | 33 | 0.9284 | 86 | 123 | 540 | 111–114 |
| 39 | 1.4 | TBVA | 0.7 | VA | 18.7 | 0.9367 | 167 | 128 | 230 | 106–108 |
| 40 | 24 | DIPF | 4.2 | FA | 25 | 0.9520 | 26 | 74 | 760 | 89–93 |

EXAMPLE 41

The procedure of Example 18 is followed but a pyrolysis catalyst (α-naphthalenesulfonic acid) and a polymerization regulator (acetone) are used.

Details of the process conditions are:

Pressure on the inlet side—2,200 atmospheres.
Ethylene—1000 parts per hour.
Tert-butyl acrylate—27.3 parts per hour.
Isobutylene—0.95 mole percent.
Oxygen—26 mole-p.p.m.
α-Naphthalenesulfonic acid—0.05 part per hour.
Acetone—1.4 moles percent with reference to ethylene.
Heat transfer medium, zone I—150° C.
Heat transfer medium, zone II—185° C.
Maximum temperature in reaction material—203° C.

In this way 168 parts per hour of a copolymer is obtained having the following physical data:

Polymerized units of acrylic acid—7.5% by wt.
Polymerized units of tert-butyl acrylate—2.4% by wt.
Melt index—164.
Density—0.9375 g./ccm.
Tensile strength—47 kg./cm.$^2$.
Tear resistance—98 kg./cm.$^2$.
Elongation at break—480%.
Melting point—90° to 92° C.

EXAMPLE 42

The autoclave described in Example 34 is charged under nitrogen devoid of oxygen with 80 g. of tert-butyl acrylate, 0.25 g. of α-naphthalenesulfonic acid and 0.8 g. of a 75% solution of ditert-butyl peroxide in heavy naphtha. A mixture of 25 mole percent of carbon monoxide and 75 mole percent of ethylene is then forced in to a pressure of 1350 atmospheres and the whole is heated within fifty minutes to 95° C. so that the pressure rises to 1700 atmospheres. Owing to the heat of polymerization liberated, the temperature and pressure rise within seven minutes to 114° C. and 1750 atmospheres, respectively.

At this moment, the pressure on the autoclave is released and cooling is effected in the manner described in Example 34. 145 g. of a pale polymer is obtained which was the following physical data:

Polymerized units of acrylic acid—4% by wt.
Polymerized units of tert-butyl acrylate—14% by wt.
Polymerized units of carbon monoxide—34% by wt.
Melt index (high load: 21.65 kg.)—0.01.
Density—1.151 g./ccm.
Tensile strength—39 kg./cm.$^2$
Tear resistance—102 kg./cm.$^2$.
Elongation at break—320%.

We claim:
1. A continuous process for producing ethylene copolymers which comprises: continuously passing the monomers
   (a) ethylene,
   (b) an alkene ester (E) of a $C_3$ to $C_{12}$ carboxylic acid and a $C_3$ to $C_8$ secondary alkanol or a $C_4$ to $C_8$ tertiary alkanol, and
   (c) a $C_3$–$C_8$ alkene,
into a reaction zone at a temperature of from 110° C. to 350° C. and at a pressure of from 100 to 8000 atmospheres such that under the reaction conditions said ester (E) pyrolyzes to form its corresponding alkene carboxylic acid and alkene while simultaneously copolymerizing the monomers to form a copolymer containing from 0.92 to 28.5% by weight of said acid and from 1.4 to 26.2% by weight of said ester (E), the amount of ester (E) being passed to said reaction zone being from 0.001 to 20 parts per 100 molar parts of ethylene; and recycling to said reaction mixture unreacted ethylene and $C_3$–$C_8$ alkene.

2. A process as claimed in claim 1 wherein an ester of acrylic or methacrylic acid with tert-butanol or tert-amyl alcohol is used as the ester (E).

References Cited

UNITED STATES PATENTS

| | | | |
|---|---|---|---|
| 3,132,120 | 6/1970 | Graham | 260—78.5 |
| 3,557,070 | 1/1971 | Anspon | 260—86.7 |

OTHER REFERENCES

Observations on the Thermal Decomposition of Poly (Tert-Butyl Acrylate) by Schaefgen and Sarasonn.
Journal of Polymer Science, vol. 58 pp. 1049–1061, 1962.

JOSEPH L. SCHOFER, Primary Examiner

U.S. Cl. X.R.

260—78.5 E, HC 79.3 A, MU, 80.6, 80.72, 80.73, 80.76, 80.75, 80.81